Aug. 29, 1944.  F. V. ADAMS  2,357,066

MICROMETER-CALIPER

Filed Oct. 26, 1943

INVENTOR.
*Frederick V. Adams*
BY
*Walter S. Edwards*
ATTORNEY

Patented Aug. 29, 1944

2,357,066

UNITED STATES PATENT OFFICE 2,357,066

MICROMETER CALIPER

Frederick V. Adams, Branford, Conn.

Application October 26, 1943, Serial No. 507,749

4 Claims. (Cl. 33—166)

This invention relates to improvements in micrometer-calipers or like measuring instruments and more particularly to improvements therein whereby a quicker and more accurate measurement reading may be made.

The usual form of micrometer-caliper is provided on its barrel with reading lines which are at right angles to the axis of its spindle and some difficulty is occasionally experienced in quickly and accurately reading the same when the edge of the sleeve is closely adjacent to one of these lines as both the said line and the numeral, designating the said line, are partly covered by the edge of said sleeve. It is therefore contemplated as one object of this invention to provide means in a micrometer-caliper, and like measuring instruments, whereby the reading line, or lines, and the numeral designating the said line will be clearly visible for quick and accurate reading.

Another object is to provide in a measuring instrument of the above nature reading lines which extend from an axially directed, or a horizontally directed, base line at an oblique angle so as not to be covered by the edge of a sleeve, or slide, and whereby a reading point will be provided where the base line and the reading lines meet, and whereby the numerals, designating the reading lines will be clearly and fully visible.

A further object of this invention is to provide an improved micrometer-caliper, or like measuring instrument which will be relatively inexpensive to manufacture, simple in construction, compact, ornamental in appearance, and very efficient and durable in use.

With the above and other objects in view, which will appear as the description proceeds, there has been illustrated in the accompanying drawing, a form in which the invention may be embodied in practice.

Figure 1:
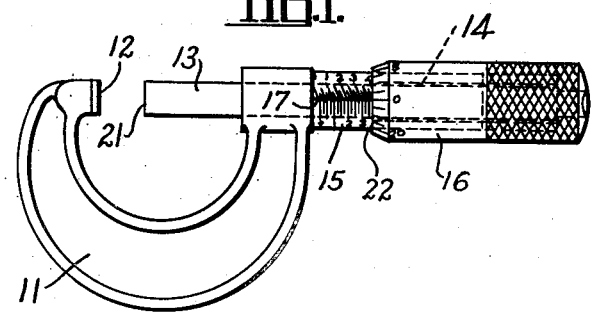
Figure 1 is a side view of a measuring instrument in the form of a micrometer-caliper in which the features and principles of this invention are embodied.

Referring now to the drawing wherein like reference numerals designate like parts throughout the several views, the numeral 11 denotes the usual frame of the micrometer-caliper, 12 the usual anvil, 13 the spindle on which is formed the adjusting screw threads 14. A barrel 15, formed on the frame 11 is internally threaded to receive the screw threads 14. A sleeve 16, adapted to encircle the barrel 15 is suitably secured to the spindle 13 whereby the latter may be rotated to adjust it toward and away from the anvil 12 to measure an article placed therebetween by comparison of certain reading lines provided on the barrel 15 and on the end edge of the sleeve 16 for such purposes.

The reading lines usually provided on the barrel 15 include a base line 17, which extends along the barrel parallel to the axis thereof and of the spindle 13. In the unimproved form of such measuring instruments, equaly spaced apart reading lines 18 extend from this base line 17 at right angles thereto, certain ones 19 of the lines 18 being designated by numerals. The reading, corresponding to the space between the end 21 of the spindle 13 and the anvil 12, is determined by comparison of the end edge 22 of the sleeve 16 with the nearest visible line 18 to which is added the reading observed by comparison of lines 23, equally spaced peripherally about the end of the sleeve 16, with the base line 17.

Figure 2:
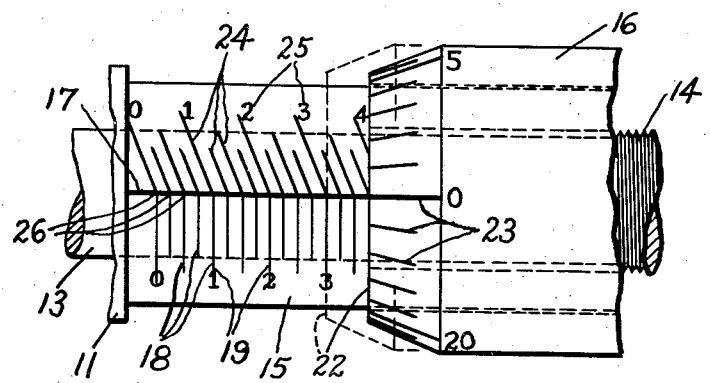
Figure 2 is a greatly enlarged view of a portion of the instrument shown in Figure 1.

By noting the dotted line position of the sleeve 16 in Figure 2, it will be observed that should a reading be required at this point the line 18 at the sleeve edge 22 and the numeral 3 designating this line 18 would be partly covered by the sleeve end edge 22 and therefor difficult to quickly read. To facilitate the reading of the instrument at this point it is proposed, in accordance with the teaching of this invention, to provide equally spaced apart oblique lines 24 extending from the base line 17.

Figure 3:
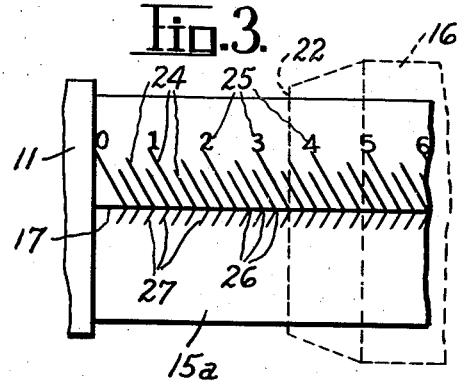
Figure 3 is an enlarged view of a portion of a micrometer-caliper wherein the features of this invention are somewhat modified in form and arrangement.

The oblique lines 24 extend away from the base line 17 at an angle from the end edge 22 of the sleeve 16 whereby the numerals 25 designating the said lines 24 will be plainly visible. These oblique lines 24 meet the base line 17 to form a reading point 26 where the corresponding lines 18 meet the base line 17. Obviously in providing a micrometer-caliper with the above described oblique lines 24 the lines 18 may be omitted if desired. Preferably, but not required by this invention, the oblique lines 24 extend at an angle of approximately 15 degrees from the end edge 22 of the sleeve 16. To accentuate the reading points 26, oppositely directed oblique lines 27 may be provided on the barrel 15a as shown in Figure 3.

Figure 4:
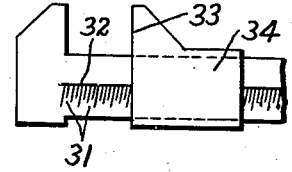
Figure 4 is a side view of another form of measuring instrument in which the features of this invention may be embodied.

It will be understood that, while the features and principles of this invention are described above in respect to a form of measuring instrument known as a micrometer-caliper, they are applicable to any other like measuring instrument wherein a part, corresponding to the sleeve 16, is movable along a part, corresponding to the barrel 15, to measure an article placed between a part, corresponding to the anvil 12, and the end surface of a part, corresponding to the end edge 21 of the spindle 13. One form of such a measuring instrument is illustrated in Figure 4 and comprises the well known form of Vernier caliper. In this form of measuring instrument the reading lines 31 extend obliquely from a base line 32 for comparison with the end edge 33 of a slide 34 as and for the purpose described above in respect to the form of micrometer-caliper.

By the inclusion of the features and principles of this invention as described above in the structive of a measuring instrument of the form, or forms, illustrated, it has been found that quicker and more accurate readings of the same are possible whereby such instruments are more efficient than are those not having the features of this invention.

It will be understood that the features of this invention may be embodied in other forms without departing from the spirit and essential attributes thereof, and it is therefor desired that the present embodiments be considered in all respects as illustrative and not restrictive, reference being had to the claims rather than to the foregoing description to indicate the scope of the invention.

Having thus fully disclosed the invention, what is claimed as new and for which it is desired to secure Letters Patent, is:

1. In a micrometer-caliper, an anvil, a spindle having an end cooperating with said anvil to receive an article therebetween to be measured, a frame for supporting said anvil and said spindle, a barrel on said frame, a sleeve secured to said spindle and encircling said barrel, said sleeve having an end edge, means to move the spindle toward the anvil and said sleeve along the barrel, a base line provided on said barrel and a series of oblique lines extending from equally spaced apart points along said base line and away from the end edge of said sleeve whereby a measurement may be read by comparison between the said end edge and the said points.

2. In a micrometer-caliper having a barrel and a sleeve movable along the barrel, a base line extending axially along said barrel and reading lines extending obliquely from equally spaced apart points on said base line, and numerals at the outer ends of certain of said oblique lines, said sleeve having an end edge for comparison with said points on said barrel for measurement readings.

3. In a micrometer-caliper according to claim 2 and wherein the oblique lines extend from the base line at an angle away from the end edge of said sleeve, and a series of lines extending at right angles from the said points on said base line are provided.

4. In a measuring instrument having a barrel and a sleeve movable along and over said barrel, a base line extending along said barrel and reading lines extending away from one side and obliquely from equally spaced apart points on said base line, and other reading lines extending from the other side of said base line to visually accentuate the said points, said sleeve having an end edge for comparison with the said points on said barrel for measurement readings.

FREDERICK V. ADAMS.